Dec. 27, 1949   S. G. NOBLE ET AL   2,492,174
SOLUTION CONCENTRATION CONTROL SYSTEM
Filed Sept. 29, 1944
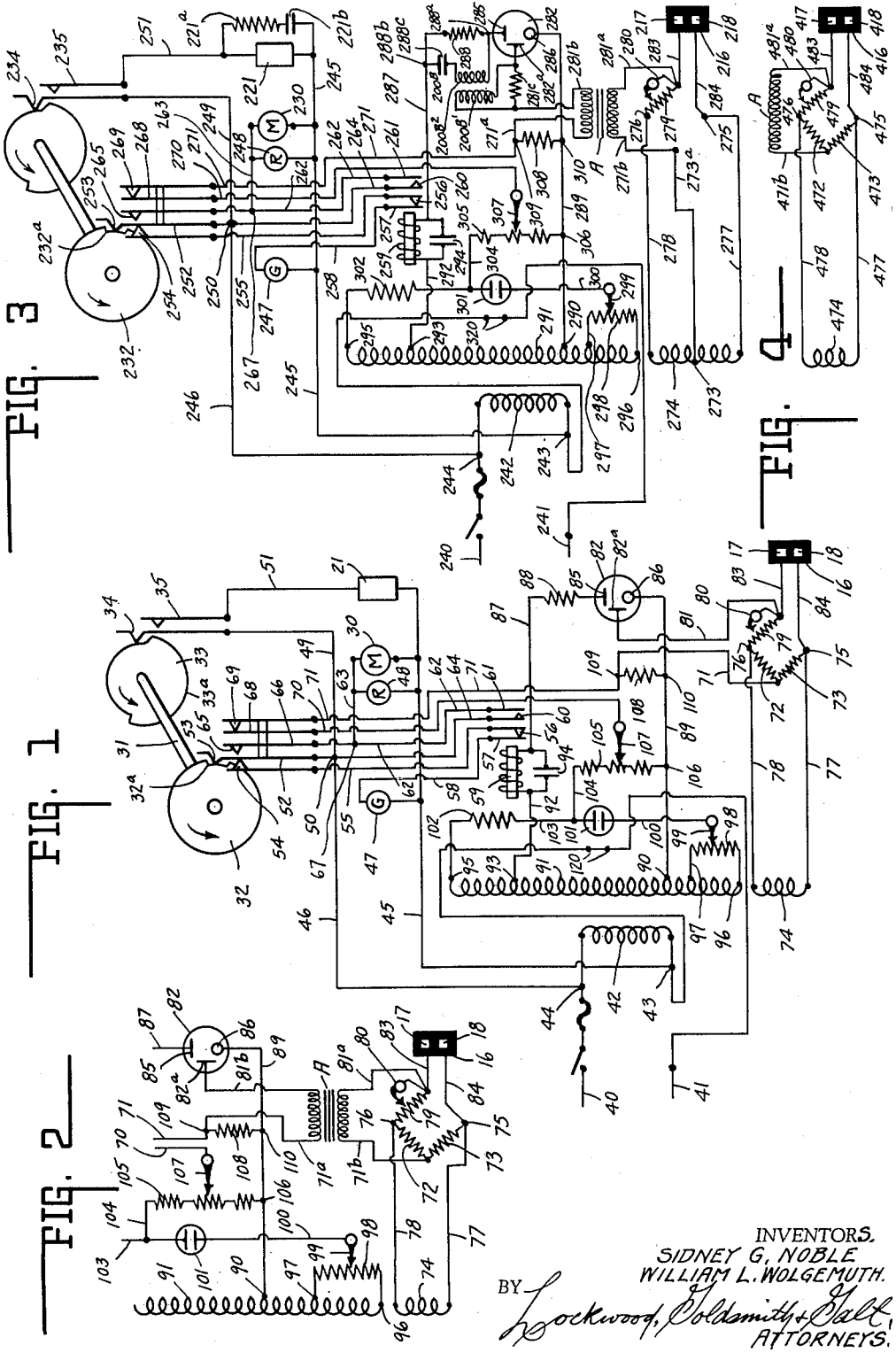
INVENTORS.
SIDNEY G. NOBLE
WILLIAM L. WOLGEMUTH.
BY Lockwood, Goldsmith & Galt
ATTORNEYS.

Patented Dec. 27, 1949

2,492,174

UNITED STATES PATENT OFFICE 2,492,174

SOLUTION CONCENTRATION CONTROL SYSTEM

Sidney G. Noble, Oak Park, and William L. Wolgemuth, La Grange, Ill.; said Wolgemuth assignor to said Noble; Elizabeth A. Noble, executrix of said Sidney G. Noble, deceased, assignor to Du Bois Company, Cincinnati, Ohio Application September 29, 1944, Serial No. 556,380

21 Claims. (Cl. 175—183)

This invention relates to a control circuit for a system of maintaining proper concentration in a liquid.

This application is a continuation in part of the prior copending application, Serial No. 404,438, filed July 28, 1941 and entiled, "Solution concentration control system," now Patent No. 2,377,363, and Figures 1 and 2 hereof are duplicates of Figs. 2 and 3 thereof.

The present disclosure also includes, see Fig. 3, a modified circuit, the advantages of which will more fully appear hereinafter.

In common with the before mentioned application disclosure the present invention contemplates a tank wherein it is desired to maintain a solution having a certain or minimum concentration. This tank is provided with two insulated electrodes exposed to the tank solution. Current is passed through the solution and the concentration thereof determines that current value.

A reservoir containing concentrated solution is arranged to supply to said tank, upon control actuation, measured amounts of concentrate for supplying deficiencies in the tank concentration all as appears more fully in said application and hereby made a part hereof.

The present invention as stated is more particularly directed to the control circuit in which the two tank exposed electrodes are a part, such circuit being responsive to tank solution resistance changes as the solution concentration varies.

The invention contemplates maintaining the concentration of an alkaline (cleaning) solution (but not necessarily restricted thereto) between certain predetermined limits by utilizing the unbalance developed across an alternating current bridge circuit, one leg of which is composed of the resistance offered by the solution to the passage of current between electrodes submerged in the solution.

Specifically this unbalance is used to trip a gaseous type, grid or starting electrode controlled vacuum tube which operates the control equipment.

The voltage applied to the control element of the tube is maintained at the required value by means of an adjustable voltage taken from a regulated source of voltage. This voltage is applied to the controlling element of the tube and in series with the variable voltage of the bridge circuit.

One object derived from the unbalance of the present invention is to provide a concentration responsive arrangement which is of such character that continuous operation of the control tube is unnecessary, thereby eliminating such tube variable factors as may be occasioned by heating of such tube incident to continuous use. This control is dependent upon the ionization point of the tube which is constant and not upon the deionization point which is variable.

The feature of the invention which is a corollary to this object is that the control is initiated by the tube but not maintained thereby.

Another object of the invention is to provide a system including a tube for control purposes which breaks down at a point independent of the supply voltage, and same may be utilized in an over-regulated arrangement or an under-regulated arrangement, as hereinafter pointed out.

A feature of the invention is that the voltage regulating system can be adjusted to produce overall consistency of operation with varying supply voltage not merely a constant voltage at a given point. The voltage regulating system when adjusted as described hereinafter to produce overall consistency of operation, is left that way. The operation of the device in service is dependent upon the amount of unbalance in the bridge circuit and regulation is not involved.

Briefly, the system operates as follows: When the working solution concentration becomes sufficiently weak, the change in current flow through same from one electrode to the other, both being exposed to the solution, causes the control system to operate. This is of cyclic character in that for each energization of the system a predetermined amount of solution concentrate is supplied to the working solution.

If after such supply the concentration in the working solution is sufficient, no further energization of the control is effected until the concentration again reaches the critical low limit incident to normal use of such working solution.

If, however, after initial energization of the control and corresponding solution concentrate supply, the working solution concentration be not sufficient, the system is reenergized, and automatically, for an additional supply of solution concentrate to the working solution and this cycle is repeated as often as necessary to finally provide the working solution with a desired minimum concentration after which no further concentrate supply is effected until by normal use of the working solution the working solution concentration is reduced to that low limit for which the control system is adjusted to provide replenishment of concentrate and to the desired amount and by repetitious or cyclic operation, if necessary, as described.

Other objects and features of the invention will be set forth more fully hereinafter.

The full nature of the invention will be understood from the accompanying drawings and the following description and claims:

In the drawings Fig. 1 is a diagrammatic view of an electrical control system and associated parts, including working solution exposed electrodes and a solenoid valve controlling concentrate supply to the working solution.

Fig. 2 is a view similar to Fig. 1 and of a portion of the circuit shown therein and modified by the inclusion of a step-up transformer.

Fig. 3 is a view similar to Fig. 1 and of a modified form of circuit.

Fig. 4 is a view similar to the lower portions of Figs. 1 to 3 and of a modified form of a Wheatstone bridge arrangement.

Fundamentally the present control system is arranged to electrically control a valve which is electrically opened and automatically closed. This valve is arranged, when open, to cause concentrate flow to the tank in which the aforesaid terminals are exposed to the working solution. This valve is open for an adjusted predetermined time and then automatically closes when deenergized. The tank accordingly is singularly or repetitiously supplied at each valve actuation with a predetermined amount of concentrate until the tank concentration is such that no further concentration additions are demanded by the control circuit.

Herein in Figs. 1 and 2 the tank mounted, working solution exposed electrodes are designated by numerals 17 and 18 and the electrically operable valve by numeral 21, see Fig. 1. Also in the latter figure 30 designates a motor which through a reduction drive slowly rotates shaft 31 on which is mounted two cams 32 and 33. Cam 33 is associated with a switch 34—35 controlling current supply to the electrically operable valve 21. When the motor stops rotating, the cam 33 is positioned as illustrated and switch 34—35 is open and the valve is not energized. This may be a solenoid valve and is preferably connected directly across the supply mains so that it does not effect the constants of control circuit. The high point 33a of the cam 33 moves open circuit constrained switch member 34 to contact member 35 and as long as the cam high point is effective, the valve is energized and hence, is open to supply concentrate as previously described.

The other cam 32 has a relieved portion 32a. When the motor is first energized, as hereinafter described, the cam 32 moves the relieved portion from adjacent the motor circuit maintaining switch 53—56 and the cam then closes that switch to maintain motor operation until the motor circuit maintaining switch or rather member 35 thereof again registers with relieved portion 32a of cam 32. The motor circuit is then broken. The interval of open valve operation is determined by the arcuate length of portion 33a and the rate of rotation of shaft 31. This is about one revolution per minute. The concentrate solution supply, as illustrated by portion 33a, is about thirty seconds. It may be greater or less as determined by the length of said cam portion 33a. A satisfactory motor is a synchronous motor operating at about 3600 R. P. M. and the reduction gear ratio is about 3600:1 relative to the cam shaft 31.

In Fig. 1 the numeral 40 indicates one supply main and 41 another of a 110-volt conventional alternating current source. A transformer primary 42 is directly connected thereto at 44 and 43, respectively. This is the source of power for the control. Line 45 from junction 43 connects to one terminal of a green signal 47, one terminal of a red signal 48, one terminal of the motor 30 and one terminal of the electrically operable valve 21.

Line 46 from junction 44 connects to junction 50 from which extends line 49 to valve switch member 34. Valve switch member 35 is connected by line 51 to the other terminal of the electrically operable valve 21. A line 52 from junction 50 connects to switch member 53 normally constrained to contact with switch member 54 so long as switch member 53 has its cam actuable portion seated in relieved portion 32a of cam 32.

Switch member 54 is connected by line 55 to contact 56 of a relay or solenoid 59 operable switch. The other contact 57 thereof herein normally contacts contact 56 and connects by line 58 to the other terminal of the green light. Hence, when the motor is not energized and the relay or solenoid 59 controlling said switch is not energized, the green signal light is energized.

Another switch normally in open circuit relation includes contacts 60 and 61. It is closed when the solenoid or relay 59 is energized. Contact 61 is connected by line 62 to line 63 connecting to the other terminal of the red signal light 48 and the other side of the motor 30. Hence, the motor and red signal light are in multiple.

Contact 60 of the second relay switch connects by line 64 to junction 50. When the relay 59 is energized the green signal light is deenergized because switch 56—57 is then open, and the motor and red signal light are energized because switch 60—61 is closed, this circuit being junction 44, line 46, junction 50, line 64, switch 60—61, line 62, the line 63, the red light and motor, line 45 and junction 43.

Upon relay 59 energization, therefore, motor 30 rotates cam 32 and 33 counterclockwise to open valve 21 and open the green light circuit at 53—54 as well as close the red signal circuit. Slight motor rotation simultaneously closes switch 53—65 which by line 66 leads to junction 67 of lines 62 and 63. This is the motor maintaining circuit and is as follows:

Junction 50, line 52, switch 53—65, line 66, junction 67, line 63, red light and motor and line 45 to junction 43. So long as the cam contacting portion of switch 53 rides the cam 32 and does not seat in the notch 32a, the motor and red light will be energized and the motor will rotate cam 32 until notch 32a again registers with switch member 53 whereupon the motor maintaining circuit will be opened.

At this point attention is called to another normally closed switch 68—69, contact 68 being connected to line 70 and contact 69 being connected to line 71. When switch 53 is associated with notch 32a of cam 32 the switch 54—53 (green light circuit) is closed as well as switch 68—69. When switch member 53 does not register with notch 32a, switches 53—54 and 68—69 are open and switch 53—65 is closed. Hence, when the motor maintaining circuit is closed, the circuit through lines 70 and 71 is open at the switch 68—69. Herein members 53 and 69 are electrically insulated from each other but mechanically connected for simultaneous movement.

Reference will now be had to the central and lower portions of Fig. 1. In the lower right portion is illustrated a Wheatstone bridge having two fixed legs 72 and 73. The line 71 connects to the junction of these two legs.

A secondary 74 of the transformer is connected by lines 77 and 78 to the other ends 75 and 76 of the legs 73 and 72, respectively. A third leg 79, has an adjustment 80 and is connected by line 81 to the starting anode 82a of tube 82. Line 83 at one end of leg 79 connects to said line 81 at the adjustment 80 and at the opposite end to terminal 17 of the plug 16 before mentioned. The other terminal 18 is connected by line 84 to junction 75 of the bridge. Hence, the lines 83—84 and terminals 17—18 and the cleaning solution between said terminals constitutes the other or fourth leg of the bridge.

Tube 82 has the anode 85 and cathode 86. This tube is normally cold and when energized or ionization occurs therein, current flows to the relay 59 because line 87 therefrom through resistance 88 is connected to the anode 85. Line 89 is connected to the cathode 86 at one end and to tap 90 on secondary 91 of the transformer. Line 92 is connected to tap 93 on said secondary as well as the other terminal of relay 59. Hence, when the tube is conditioned, the relay is energized which as before stated initially closes the motor pick-up circuit or starting circuit. A condenser 94 may bridge the relay 59 as shown being connected across lines 87 and 92.

The secondary 91 of the transformer has one end tap 95, an opposite end tap 96 and another intermediate tap 97. A resistance 98 bridges taps 96—97 and a manually adjustable contact 99 determines the adjustment at said resistance. Contact 99 connects by line 100 to a voltage regulator tube 101. Tap 95 is connected to a resistance 102, the other terminal of which is connected by line 103 to the other terminal of tube 101.

A line 104 connects one end of resistance 105 to line 103 at tube 101. The other end of said resistance is connected at 106 to line 69 before mentioned. A manually adjustable contact 107 is associated with resistance 105 and connected to line 70 before mentioned, including cam operable switch member 68. A resistance 108 is connected at 109 to line 71 and at 110 to line 89.

The foregoing constitutes the several circuit elements and connections.

The voltage applied to the control element of the tube 82 is maintained at the required value by means of an adjustable voltage taken from a regulated source of voltage and applied to the controlling element of the tube in series with the unbalance voltage of the bridge circuit.

In a voltage regulating system, proper, or normal regulation is accomplished when the output voltage is constant regardless of whether the input voltage rises above or drops below normal input voltage. Over-regulation occurs when the output voltage decreases as the result of an increase in the input voltage or vice versa. Under regulation occurs when the output voltage increases as the result of an increase in the input voltage or vice versa, that is, under-regulation does not completely eliminate the normal change in the output of the regulating device while over-regulation more than compensates for such a change.

In the present device, two voltages are added—(1) a regulated voltage which is obtained from the voltage divider (resistance 105) between points 106 and 107, and (2) an unregulated voltage which is the unbalanced voltage taken from the bridge circuit between the junction of resistances 72 and 73 and the junction of lines 81 and 83. In order that the sum of these two voltages shall be constant with either a rising or a dropping supply voltage, it is necessary that the regulated portion of the voltage be properly adjusted to compensate for the change occurring in the unregulated portion of the voltage. This can be accomplished in two ways: (1) if the polarity of the two voltages is such that the regulated system must be so adjusted (by means of the variable resistance 98) that the regulated voltage is over-regulated, that is so that the regulated voltage drops slightly when the supply voltage rises and vice versa; (2) if the polarity of the two voltages is such that the unregulated voltage opposes (or subtracts from) the regulated voltage the regulating system must be so adjusted that the regulated voltage is under-regulated.

If it is considered that the algebraic sum of the two voltages mentioned above is the output of a regulating device, both of the conditions mentioned above produce perfect regulation, that is both produce a total output voltage which is independent of the line voltage.

It might be well to keep in mind that the term "voltage" is not an exact term, as there are several kinds of voltage; namely, effective voltage, average voltage, peak voltage, et cetera. The voltage with which the present invention is concerned is that which causes the tube to ionize and this is practically the peak value of the voltage. It is this fact which makes possible the use of so simple a form of voltage control device as this method of voltage control produces a distorted wave form.

The control of the working solution within the required range is accomplished by electrically operating a solenoid 21 controlling a supply of concentrated solution. The valve and certain indicating lights 47 and 48 are operated from contacts controlled by motor-driven cams 32 and 33 operating in conjunction with the contacts of relay 59 connected into the anode circuit of the controlling tube 82. The circuit is so devised and the cams so constructed as to provide a three-step process consisting of a test period, a replenishing period, and a mixing period, the replenishing and mixing periods occurring only when the results of the test indicate a deficiency in the concentration of the solution in a main vessel not shown. The test period may be of long or short duration. It will be long if concentration reduction is slight. It will be short if such reduction is rapid. It may be infinitesimal if after one cycle, the working solution is still too low in concentration.

The control voltage is supplied to the tube 82 through contacts 68—69 in the cam controlled circuit, including lines 70—71, which operating in conjunction with a grounding resistor 108 permits extinguishing the tube 82 as soon as the cam 32 has moved far enough to cause the motor driving the cam to be "locked in" through contacts 53—65 operated by the cam. This type of operation results in the control being dependent only upon the breakdown or ionization point of the tube 82 (which is stable for a cold tube) and is independent of the extinguishing or deionization point of that tube (which is unstable). It also eliminates error due to shifting of the breakdown point of the tube 82 by virtue of heating occurring within the tube 82 when the tube is passing current; and as the period of operation of the tube 82 is but a few seconds long, therefore, the tube remains cold. This arrangement also has the advantage of appreciably increasing the life of the tube 82.

The circuit operating the lights is so arranged that the only time the green light can be on and the red light off is when the cam is in the "normal" position and the main control relay 59 is not energized. This combination occurs only when the control circuit is in the "test" condition and the resistance offered by the electrodes 17—18 and associated solution is of such value as to indicate a satisfactory concentration in the working solution in the tank and to which solution the electrodes 17 and 18 are exposed.

The electrolytic condenser 94 of rather high capacity (10 mf. to 100 mf., depending upon the constants of the relay) provides a time delay of a fraction of a second so that if the ionization tube flashes or has a tendency to flash, the control circuit is not operated unless and until the concentration condition positively requires operation that causes the tube to ionize and remain ionized for a sufficient interval to insure setting up the control for motor and valve operation, et cetera.

It has been established that when the line voltage varies from a normal voltage of 115 volts by as much as 10 volts, either above or below normal, the voltage applied to the control element of the tube does not vary more than a few hundredths of a volt. The tube 82 illustrated can be of RCA–OA4–G type. Tube 101 can be of VR–105–30 or VR–150–30 type. The first mentioned tube in each instance is preferred in the specific circuit diagram illustrated.

The line 41 may include points 120 which is a jumper connection in the base of the regulator tube 101. Removal of tube 101 thus opens the primary circuits and prevents the application of excessive voltages to the secondary circuits. This is a protective factor.

Whenever desired, a small step-up transformer A may be inserted in the output of the bridge circuit. This is merely a means of increasing the overall sensitivity and does not affect the basic operation. This is illustrated in Fig. 2.

Hereinbefore the two embodiments illustrated have, for example, indicated use of OA4 tubes at 82 and VR–105–30 or VR–150–30 tubes at 101. In actual practice, however, the first mentioned tubes are usually insufficiently stable to maintain ionization of the gas in said tubes. Only a small percentage, to date a maximum of 5%, has been found sufficiently stable for use herein. Since this is an unsatisfactory commercial condition, due to variations in the commercial tubes of this type, a modification of the aforesaid invention was devised whereby substantially all commercial tubes of this type (OA4) will successfully operate.

Such modification is illustrated in Fig. 3 and same includes the introduction into the circuit of certain elements to stabilize the operation of such tube so that same will fire cleanly. The theory of this modification is briefly as follows: The surge of current in the anode portion of the OA4 tube, due to the initial ionization of the gas in said tube, is utilized to induce, by means of a transformer, a positive surge in the starter circuit, which, in turn causes the discharge to the anode circuit to perpetuate itself.

In Fig. 3, the jumper 320 for tube and like protection is again included in the circuit but might be omitted, all as set forth relative to jumper 120 in Fig. 1 between lines 41 and 43. Preferably, however, it is included as a protection to the OA4 tube (see 82 in Figs. 1 and 2) and 282 in Fig. 3 when the VR–105 tube 101 or 301 is removed from the circuit.

In Fig. 4, like Figs. 1 and 2, the resistances 472 and 473 are included as legs of the Wheatstone bridge (see resistances 72 and 73 in Figs. 1 and 2). However, in Fig. 3 these are shown omitted and line 271b is connected to a tap 273 of secondary 274 by line 273a. This in effect provides that the resistance of the two portions of the secondary 274 constitute the aforesaid corresponding two legs of the resistance. If desired, in Figs. 1 or 2, this circuit variation may be utilized.

It will be noted that numerals of the primary series increased by 200 and 400 designate in Figs. 3 and 4 respectively parts similar or identical to those in Figs. 1 and 2 designated by said primary numerals.

Another departure found in the Fig. 3 modification and which may also be utilized in the Figs. 1 and 2 modifications, without departing from the scope hereof, is that across valve operating coil or solenoid 221 and between lines 251 and 245 there is provided a resistance 221a and condenser 221b. The purpose thereof is to compensate for the inductance factor of the coil. The practical result is that sparking between contacts 235—234 in the coil circuit is reduced, thereby reducing wear on said points which insures longer life in this particular switch arrangement.

Reference will now be had to the OA4 tube (282) portion of the circuit for the major distinction of the Fig. 3 embodiment over that illustrated in Figs. 1 and 2 and for the purposes initially emphasized herein.

Preferably this tube (282) circuit includes transformer 200A (see transformer A, Fig. 2). Line 289 leads from tap 290 to portion 286 of tube 282 and to resistance 308 at 310. Line 287 leads from resistance 288 to the solenoid 259. Resistance 288 connects to anode portion 285 of tube 282. Herein line 281b from transformer A connects to a resistance 281c in turn connected to the other terminal (control anode) 282a of tube 282. Line 271a from transformer 200A leads to resistance 308 at 309. The aforesaid resistance 281c is an addition over what is disclosed in Figs. 1 and 2.

A portion 200B¹ of a transformer 200B is connected across this resistance 281C as shown. The other portion 200B² of this transformer is in series with condenser 288c, and this series connection is connected across resistance 288 at 288b and 288a as shown.

The aforesaid is a complete description of parts found in Figs. 3 and 4 which depart from what is shown in Figs. 1 and 2. Since a complete description of what is disclosed in Fig. 1 has been set forth hereinbefore, it is believed unnecessary to describe the other parts illustrated in Fig. 3 since they are similar or identical thereto and function as before described.

A point here emphasized is that the OA4 tube is of gaseous and not vacuum type. Accordingly such a tube has a longer life than a vacuum tube and its operation is more consistent during ageing. Also a gaseous tube utilizes no power when not operating. Since such a tube depends upon the ionization of a gas for operation, it has what might be said to be a "trigger" action, that is an automatic build-up of current once started. This gives the tube a lock-in characteristic not reversible by any impulse which might result from the Wheatstone bridge circuit momentarily indicating a satisfactory solution immediately following an indication of an unsatisfactory solution.

The resistance 308 in Fig. 3 aforesaid (see also 108 in Figs. 1 and 2) terminates the ionization within the OA4 tube, such resistance tying the starting electrode to the cathode thereby reducing the starting electrode potential to that of the cathode (except for Wheatstone bridge unbalance voltage) when the set-up voltage is removed by opening of the set-up voltage circuit.

As before stated, the O-A-4 tube herein is of gaseous discharge type which operates when the control electrode is raised above a certain critical potential and maintains ionization by virtue of the potential applied to the main anode. Since the system functions on alternating current, the maintenance of the discharge through the tube is discontinued each time the voltage drops to zero in the normal change occurring in each cycle of the alternating current voltage. Thus the tube must be reionized twice during each cycle of the alternating current voltage (120 times a second for a 60 cycle current). This is accomplished only when the voltage on the starting anode on each subsequent cycle is still at a potential great enough to initiate ionization of the gas of the tube.

This circuit accomplishes same by placing on the starting anode a controlled voltage of potential just below that required to initiate ionization and utilizing the voltage from the pick-up circuit (which is of the Wheatstone bridge type) to raise the voltage on the starting anode to that required to initiate ionization. This is accomplished by placing the voltage from the pick-up circuit in series with the controlled voltage on the starting anode. Thus, the operation of this device depends upon only a very small increment of voltage obtained from the pick-up circuit. This makes the circuit extremely sensitive to minute variations in the voltage from the pick-up circuit since the controlled voltage placed on the starting anode can be brought as close to that required for ionization of the tube as desired.

This particular circuit has a distinct advantage from the standpoint of voltage control since the voltage from the pick-up circuit, being but a very small portion of the total voltage applied to the starting anode, can be compensated for by the adjustment of the regulated voltage for slight over-regulation (or under-regulation as the case may be) and therefore need not be controlled. This eliminates the necessity for attempting to control the voltage on the bridge circuit. This is very desirable because the bridge circuit may draw considerable current and a voltage control system capable of supplying a constant voltage where a sizeable current is being drawn is necessarily rather complex.

The fixed voltage applied to the starting anode to bring it to a potential just below that required for ionization can be readily controlled because it is static in nature, that is no current is being drawn by the tube previous to ionization. This permits the use of a very simple voltage control device since no power need be drawn from the control circuit and the wave form is not important.

Absolute constancy of operation with a varying supply voltage can, however, be obtained in spite of the very small variation of the voltage from the pick-up circuit by adjusting the regulation of the fixed voltage applied to the starting anode such that this voltage is slightly over regulated, that is a very small change in this voltage opposite to the change in the change of the supply voltage can be obtained to exactly offset the uncorrected change in the voltage from the pick-up circuit.

Various modifications of the regulated voltage system may be utilized, if desired. However, that herein illustrated to date has furnished the best results; hence, same is illustrated by way of example.

It is here emphasized that included herein is a voltage control that is susceptible of other applications than disclosed in Figs. 1 to 3 inclusive. This portion of the invention disclosed is of particular value and useful when a voltage is involved that is approximately static in nature and where wave form is not important.

Referring to Fig. 1, assume the voltage across primary 42 is $Vp$ and the voltage across taps 90 and 95 of the secondary is $Vs$, the voltage across tap 90 of the secondary and adjustable arm 99 of the resistance 98 is $Vc$, the voltage across tube 101 is $Vt$ and the voltage across lines 89 and 104 is $Vo$.

Now if the supply voltage across lines 40 and 41 increases from the normal value, voltage $Vs$ increases in direct proportion and voltage $Vt$ increases slightly due to the inability of the tube 101 to maintain a constant voltage drop with such a change in secondary voltage. If the output voltage of the voltage control circuit was taken from directly across tube 101 in the conventional manner, this slight increase in voltage would be very objectionable. The output voltage $Vo$ is, however, taken from across lines 89 and 104 and consists of the vectorial difference of voltages $Vc$ and $Vt$. Voltage $Vc$ increases in direct proportion to the supply voltage and is of such a value that the component of the change in this voltage which is in phase opposition to $Vt$ is just equal to the incremental change in $Vt$. Thus the vectorial difference is constant with changes in the supply voltage as long as the voltage impressed on tube 101 is within the operating range of the tube used.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A voltage regulator system responsive to a variable medium variation for operation, including in combination a transformer having a primary, a secondary for control power supply, a second secondary, a Wheatstone bridge arrangement across the second secondary, a manually adjustable circuit including a portion of the first mentioned secondary and a voltage regulating tube, a control relay in series with an operating portion of an ionizable tube having a starting portion, the tube and relay each being connected to the first mentioned secondary, a manually adjustable voltage divider circuit connected to the connection between the voltage regulating tube and the connection between the first mentioned secondary and the ionizable tube and also connected to the Wheatstone bridge between the second mentioned secondary connection thereto, said Wheatstone bridge comprising a variable medium exposed pair of electrodes for one leg and in series with a predetermined value resistance for another leg, the last mentioned resistance predetermined value being critical relative to the variable resistance value of the electrode including leg, and a starting connection between the last mentioned series connection and the starting portion of the ionizable tube.

2. A system as defined by claim 1 wherein a resistance is connected between the second mentioned manually adjustable circuit and the connection between the ionizable tube and the first mentioned secondary.

3. A system as defined by claim 1 wherein the ionizable tube is of gaseous type.

4. A system as defined by claim 1 wherein in electrically operable means is in multiple with the transformer primary and subject to a switch responsive to ionizable tube operation, and a voltage regulating tube carried jumper is in series with said primary for ionizable tube protection.

5. A system as defined by claim 1 wherein an electrically operable means is in multiple with the transformer primary and subject to a switch responsive to ionizable tube operation, a voltage regulating tube carried jumper is in series with said primary for ionizable tube protection, and a series connected condenser and resistance in multiple with the electrically operable means for ionizable tube responsive switch contact protection.

6. A system as defined by claim 1 wherein a second transformer is provided and operatively interposed between the Wheatstone bridge and the ionizable tube.

7. A system as defined by claim 1 wherein an electrically operable means is in multiple with the transformer primary and subject to a switch responsive to ionizable tube operation, a voltage regulating tube carried jumper is in series with said primary for ionizable tube protection, and a second transformer is provided and operatively interposed between the Wheatstone bridge and the ionizable tube.

8. A system as defined by claim 1 wherein an electrically operable means is in multiple with the transformer primary and subject to a switch responsive to ionizable tube operation, a voltage regulating tube carried jumper is in series with said primary for ionizable tube protection, a series connected condenser and resistance in multiple with the electrically operable means for ionizable tube responsive switch contact protection, and a second transformer is provided and operatively interposed between the Wheatstone bridge and the ionizable tube.

9. A system as defined by claim 1 wherein a resistance is connected between the second mentioned manually adjustable circuit and the connection between the ionizable tube and the first mentioned secondary, an electrically operable means is in multiple with the primary and subject to a switch responsive to ionizable tube operation, and a voltage regulating tube carried jumper in series with said primary for ionizable tube protection.

10. A system as defined by claim 9 wherein a series connected condenser and resistance is in multiple with the electrically operable means for ionizable tube responsive switch contact protection.

11. A system as defined by claim 1 wherein an electrically operable means is effectively in multiple with the coil of the control relay and subject to a switch responsive to ionizable tube operation, a voltage regulating tube carried jumper in series with said primary for ionizable tube protection, and a series connected condenser and resistance in multiple with the electrically operable means for ionizable tube responsive switch contact protection.

12. A system as defined by claim 1 wherein a resistance is connected between the second mentioned manually adjustable circuit and the connection between the ionizable tube and the first mentioned secondary, and a second transformer is provided and interposed between the Wheatstone bridge and the ionizable tube.

13. A system as defined by claim 1 wherein a resistance is interposed between the series connected control relay and ionizable tube, and a second transformer has one winding in series with a condenser, same being in multiple with said last mentioned resistance, the starting connection including a resistance in multiple with the other winding of the last mentioned transformer.

14. A system as defined by claim 13 wherein the ionizable tube is of gaseous type.

15. A system as defined by claim 1 wherein a resistance is interposed between the series connected control relay and ionizable tube, and a second tranformer has one winding in series with a condenser, same being in multiple with said last mentioned resistance, the starting connection including a resistance in multiple with the other winding of the last mentioned transformer, and a resistance is connected between the second mentioned manually adjustable circuit and the connection between the ionizable tube and the first mentioned secondary.

16. A system as defined by claim 1 wherein a resistance is interposed between the series connected control relay and ionizable tube, and a second transformer has one winding in series with a condenser, same being in multiple with said last mentioned resistance, the starting connection including a resistance in multiple with the other winding of the last mentioned transformer, an electrically operable means in multiple with the first mentioned transformer primary and subject to a switch responsive to ionizable tube operation, and a voltage regulating tube carried jumper in series with said primary for ionizable tube protection.

17. A system as defined by claim 16 wherein a series connected condenser and resistance is in mulitple with the electrically operable means for ionizable tube responsive switch contact protection.

18. A system as defined by claim 1 wherein a resistance is interposed between the series connected control relay and ionizable tube, a second transformer has one winding in series with a condenser, same being in multiple with said last mentioned resistance, the starting connection including a resistance in multiple with the other winding of the last mentioned transformer, and a third transformer and interposed between the Wheatstone bridge and ionizable tube ahead of the second mentioned transformer.

19. A system as defined by claim 1 wherein a resistance is interposed between the series connected control relay and ionizable tube, and a second transformer has one winding in series with a condenser, same being in multiple with said last mentioned resistance, the starting connection including a resistance in multiple with the other winding of the last mentioned transformer, and the second secondary of the first mentioned transformer includes a median tap and the resistance of this second secondary comprises a pair of balanced resistance legs of said Wheatstone bridge.

20. A voltage regulating system including a transformer primary, a secondary, a gaseous tube, a resistor connecting one terminal thereof to the secondary, a second secondary series connected to said tube at another terminal thereof, and to the first mentioned secondary and in opposition thereto, the junctions of said secondaries and the tube and resistor constituting points of constant potential output for variable voltage applied to said primary.

21. A system as defined by claim 20 wherein there is interposed between the second secondary and the tube an adjustable resistance for adjusting the opposing force of said second secondary.

SIDNEY G. NOBLE.
WILLIAM L. WOLGEMUTH.

REFERENCES CITED

The following references are of record in the file of this patent:

UNITED STATES PATENTS

| Number | Name | Date |
| --- | --- | --- |
| 1,635,779 | Carter | July 12, 1927 |
| 1,774,457 | Singleton | Aug. 26, 1930 |
| 1,845,231 | Browning | Feb. 16, 1932 |
| 1,967,303 | Grant | July 24, 1934 |
| 2,189,462 | Doule et al. | Feb. 6, 1940 |
| 2,215,805 | Wills | Sept. 24, 1940 |
| 2,221,306 | Christie | Nov. 12, 1940 |
| 2,312,357 | Odquist et al. | Mar. 2, 1943 |

FOREIGN PATENTS

| Number | Country | Date |
| --- | --- | --- |
| 39,690 | France | Nov. 24, 1931 |
| (Addition to No. 699,791) | | |